Sept. 26, 1950     B. H. WOODRUFF     2,523,853
FROZEN CUSTARD MACHINE

Filed Oct. 5, 1948     3 Sheets-Sheet 1

INVENTOR.
Ben H. Woodruff,
BY
Fooman L. Mueller
Atty.

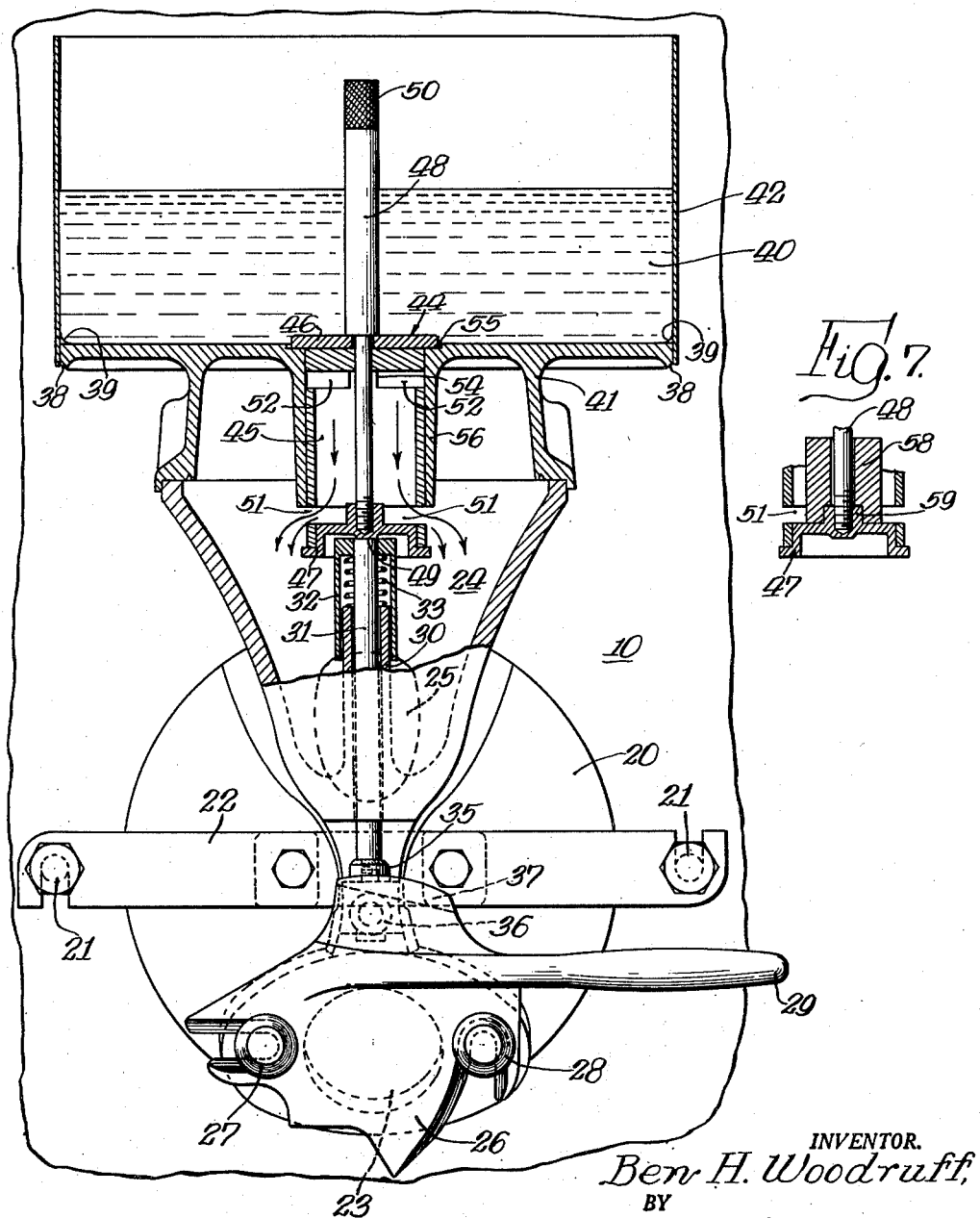

Sept. 26, 1950     B. H. WOODRUFF     2,523,853
FROZEN CUSTARD MACHINE

Filed Oct. 5, 1948     3 Sheets-Sheet 3

INVENTOR.
Ben H. Woodruff,
BY
Foorman L. Mueller
Atty.

Patented Sept. 26, 1950

2,523,853

UNITED STATES PATENT OFFICE 2,523,853

FROZEN CUSTARD MACHINE

Ben H. Woodruff, Chicago, Ill.

Application October 5, 1948, Serial No. 52,933

16 Claims. (Cl. 62—114)

This invention relates generally to machines for making frozen custard, ice cream or other frozen products and more particularly to apparatus for automatically admitting liquid mixture into the machine at a rate corresponding to the amount of frozen mixture which is withdrawn therefrom.

Machines for the making and vending of frozen custard, ice cream, and other frozen products are well known in the art and are being used in relatively large numbers. Present machines have been of two general types, the first which might be considered "one-shot" or "batch" machines in which liquid mixture is placed in the machine and frozen and then drawn off as desired, and the second which are continuous machines. In "one-shot" machines, after the frozen custard or other frozen product has all been removed, the machines must be again filled and the cycle of freezing again started causing a delay in serving of the frozen product. These machines are, therefore, undesirable as a large amount of time is lost while the machines are in the freezing cycle. This requires a large number of machines to provide a large volume of frozen custard and a correspondingly large amount of labor to keep the machines in operation. The second type of machines provide continuous operation with liquid mixture being continuously supplied thereto and a continuous flow of the frozen custard produced thereby. These continuous machines are objectionable in that they are large and cumbersome and installation thereof is very costly. In order to produce the large quantities of frozen custard which may be required as certain times, the output will be too great when the demand is small. Storing of the frozen custard is entirely unsatisfactory as the custard becomes granular when retained at a low temperature without mixing thereof.

It is, therefore, an object of the present invention to provide an improved automatic continuously operated frozen custard machine.

A further object of this invention is to provide a machine for making frozen custard, ice cream, or other frozen dessert which operates continuously and which may provide custard at any desired rate.

Another object of this invention is to provide apparatus for adding liquid mixture to a freezing machine, automatically as the frozen mixture is withdrawn, so that the freezing chamber of the machine remains filled at all times.

Still another object of this invention is to provide a device for use with a "one-shot" or "batch" frozen custard machine for converting the same for use either for continuous or batch operation.

A still further object of this invention is to provide a device for introducing liquid mixture into a freezing machine in which the possibility of unintentional flow of the liquid into the machine is substantially eliminated.

A feature of this invention is the provision of apparatus for introducing liquid into a freezing machine including a metering valve for introducing the mixture which is operated by the gate, valve, or faucet through which the frozen mixture is withdrawn.

A further feature of this invention is the provision of a frozen custard machine having a gate for withdrawing custard therefrom which operates a valve so that the valve is filled with mixture when the gate is open and the mixture is emptied into the machine when the gate is closed.

A still further feature of this invention is the provision of closure member for use with a standard "batch" freezer having valves providing regulated continuous operation.

Another feature of this invention is the provision of a metering valve for controlling the flow of liquid mixture into a frozen custard machine, having entrance and exit ports arranged so that both cannot be simultaneously open and in the event that the valve sticks in any position, the mixture cannot flow through.

Still another feature of this invention is the provision of a metering valve for automatically admitting liquid mixture into a frozen custard machine in which inserts may be used so that the quantity measured by the valve can be varied.

Further objects, features and advantages will be apparent from a consideration of the following description when taken in connection with the accompanying drawings in which:

Fig. 2 is a cross-sectional front view showing the details of the machine;

Fig. 7 illustrates the use of inserts in the valve for changing the volume thereof.

In practicing the invention there is provided a frozen custard machine including a chamber into which the liquid mixture may be placed for freezing. Although the machine is referred to generally as a frozen custard machine it is apparent that it may be used for preparing ice cream or other frozen desserts or any other frozen mixtures. Means are provided for refrigerating the chamber and for stirring the mixture therein. A closure is provided for the chamber including an opening having a gate for controlling the withdrawal of frozen custard from the chamber. The word gate is used in this specification to cover any means for controlling the withdrawal of the frozen mixture. A cavity is provided in the closure and a container for liquid is supported thereon. A metering valve is provided to control the flow of liquid from the container to the cavity. The metering valve is connected to the gate and arranged so that the valve is filled with liquid when the gate is opened and the liquid is emptied into the cavity when the gate is closed. As a fixed amount of custard is normally withdrawn at any time, the valve can be arranged to provide the quantity of mixture required to replenish the supply in the chamber.

Figure 1:
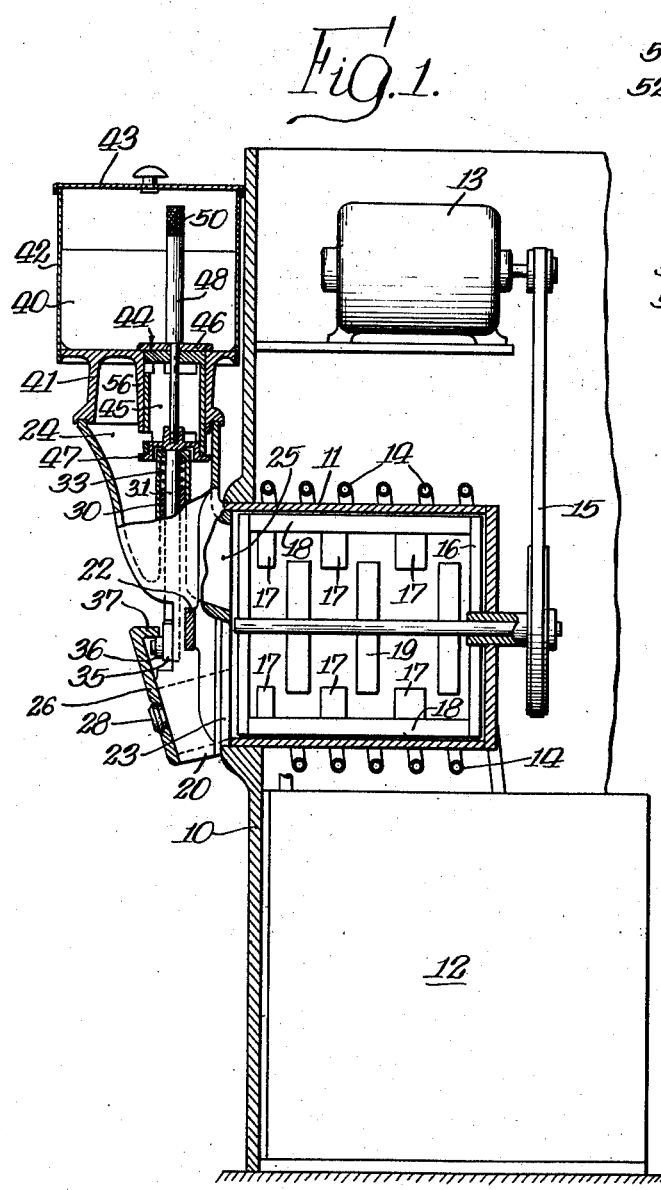
Fig. 1 is a cross-sectional view showing generally the structure of the frozen custard machine in accordance with the invention.

Referring now to the drawing, Fig. 1 illustrates the general arrangement of a frozen custard machine in accordance with the invention. The machine includes a frame 10 to which is secured a cylindrical chamber 11, refrigerating apparatus 12 and a motor 13. The refrigerating apparatus provides a flow of refrigerant in the coil 14 surrounding the chamber 11 and may be automatically controlled to maintain the chamber 11 at any desired temperature. The motor 13 operates through belt 15 to rotate dasher 16 within the chamber. The dasher may include portions 17 projecting radially into the chamber and scrapers 18 for removing the custard from the edges of the chamber. A fixed member 19 may also be provided within the chamber to facilitate agitation of the mixture therein.

The chamber 11 has an open front on which a closure member 20 is positioned. As clearly shown in Fig. 2, the closure 20 may be removably secured to the frame 10 by the bolts 21 mounted on the frame and the bar 22 secured to the closure member. The closure 20 may be cast of dairy metal and includes an opening 23 through which the frozen custard may be withdrawn and a cavity 24 connecting through opening 25 to the chamber 11 for supplying the liquid mixture thereto. For closing the opening 23 there is provided a gate 26 which is removably supported by studs 27 and 28 mounted on the closure member. The stud 27 acts as a pivot and the stud 28 as a latch to hold the gate 26 securely in place when the gate is closed. A handle 29 is provided for opening the gate.

The closure member 20 with the cavity 24 may be cast as an integral unit. A tubular member 30, which may also be a part of the integral unit, is provided within the cavity 24. The tubular member 30 is adapted to receive a plunger 31 having a cup shaped cap 32, the outer portion of which surrounds the tubular member 30. A spring 33 is provided in the cap to bias the plunger in an upward direction. The plunger 31 is threaded at the bottom into a roller block 35 (Fig. 6) which carries a roller 36. The gate 26 includes a projection 37 which engages the roller 36 to operate the plunger. As will be apparent from a consideration of Figs. 2 and 3, when the gate 26 is closed the plunger 31 will be moved downwardly by the projection 37 so that the spring 33 is compressed. When the gate 26 is opened the spring 33 will cause the plunger 31 to move up to the extent permitted by roller block 35 coming in contact with the body of metal cover 20.

As clearly shown in Figs. 1 and 2, a container 40 is supported on the closure 20 and includes a base casting 41 supported on the edges forming the cavity 24 and a rectangular surrounding portion 42. The base casting may be made of dairy metal and the rectangular portion of stainless steel. The portions may be secured together by brazing the edges as shown at 38 and by a soft solder fillet 39 which provides a rounded corner. A removable cover 43 which may also be stainless steel is provided for the container. Supported in a tubular projection 56 in the base member 41 is a metering valve structure 44 including a cylinder 45, top plate 46 and bottom plate 47. The components of the valve are removably secured together by the spindle 48 which threads into the bottom plate 47. The valve may be operated by the plunger 31, the bottom plate 47 of the valve including a projection 49 engaging the top of the plunger 31. Therefore, the vertical movement of the plunger 31 is transmitted to the valve 44 for operating the same. It is to be noted that the spindle 48 includes a knurled portion 50 at the top for manual operation of the valve if this is desired.

Figures 3, 4:
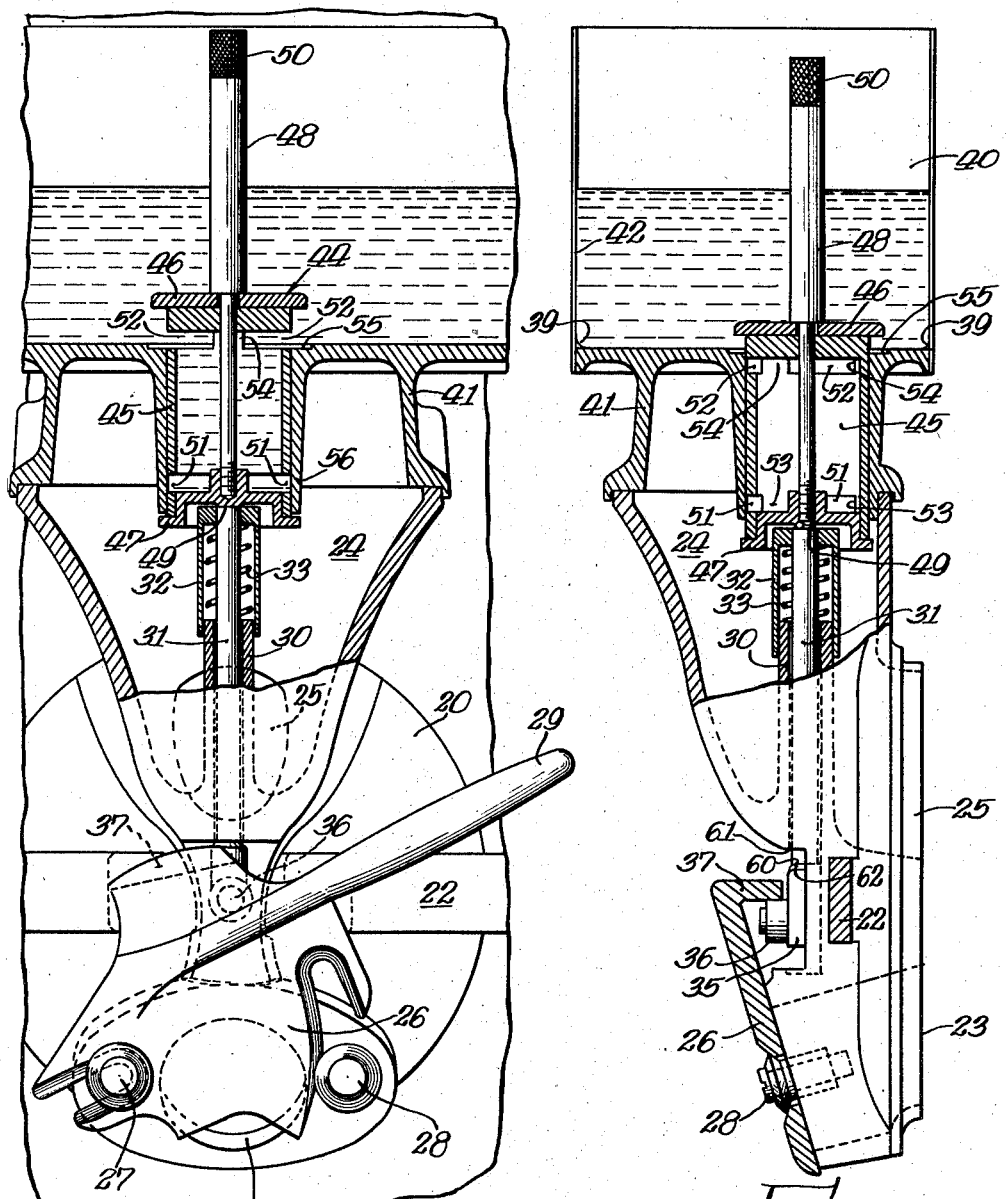
Fig. 3 is a front view similar to Fig. 2 with the gate open.
Fig. 4 is a side view illustrating the gate in an intermediate position.

The operation of the valve 44 will become apparent from a consideration of Figs. 2–5 inclusive. The valve cylinder 45 includes two sets of ports, the lower ports 51 and the upper ports 52. The ports 51 are separated by three small lands 52 and, similarly, the ports 52 are separated by lands 54. Fig. 2 shows the valve closed with the top plate 46 bearing against an annular recess 55 in the base member 41. The engaging surfaces of the top member 46 and the recess 55 may be lapped so that a tight seal is provided therebetween to prevent flow of the liquid in the container 40 through the valve. Fig. 3 shows the valve structure 44 held upwardly in the open position by the plunger 31 so that the upper ports 52 communicate with the liquid in the container 40. It will be noted that in this position the ports 51 are closed by the tubular portion 56 of the base 41 so that liquid flowing into the cylindrical valve cannot escape. When the gate 26 is closed as illustrated in Fig. 2, the plunger 31 will be drawn down and the valve 44 will drop so that the liquid therein is emptied through the ports 51. This liquid flows from the cavity 24 through the opening 25 into the freezing chamber.

The valve cylinder 45 and the ports 51 and 52 therein are so arranged that in the event that the valve should stick in any position, the liquid will not flow from the container 40 into the cavity 24. This is illustrated in Fig. 4 in which the valve is shown in a position between the upper and lower limits. In this position the valve is high enough that the ports 51 are closed so that any liquid in the valve is retained therein and yet the valve is not high enough for the ports 52 to be open and permit additional fluid to flow therein. It is, therefore, apparent that if the valve is moved further up, although ports 52 might open, ports 51 will remain closed. Also if the valve is moved downwardly so that the ports 51 may open, the ports 52 will necessarily close. In a practical embodiment of the invention the width of each port is ½" and the entire movement required for operation of the valve is ⅝". This provides a distance of ⅛" during which both valves are completely closed precluding any possibility of the valves sticking in such a position that liquid from the container may enter through the ports 52 and empty through the ports 51 into the cavity 24.

It is apparent that the amount of liquid which is admitted into the freezer by each operation of the gate 26 depends upon the volume of the valve 45. The amount of custard withdrawn during each operation of the gate will generally be the same. That is, the machine will normally be used to fill containers selling for a given price. However, it may be desired to change the amount of the frozen mixture withdrawn at each operation. That is, it might be desired to set up one machine for dispensing 5¢ cups and a second machine for dispensing 10¢ cups. Also, the amount of custard frozen at any price, for example, 10¢, might be different in various areas depending upon the cost of the mixture and the overhead required for operating the machine. For this reason, provisions have been made for altering the amount of liquid which may be admitted into the freezing chamber on each operation of the gate. This may be done by providing inserts in the valve as indicated in Fig. 7. The insert 58 may be placed in the valve when the bottom member 47 is removed from the cylinder 45. The insert has an opening to receive the spindle 48 and a recess for receiving the hub 59 of the bottom closure 47. It is obvious that inserts 58 of various sizes may be provided for changing the effective volume of a valve and, therefore, controlling the amount of liquid admitted into the chamber at each operation.

Considering now the operation of the frozen custard machines, the chamber 11 is first provided with the required amount of mixture so that the chamber will be filled with custard when frozen. This original quantity of mixture may be provided by removing the container 40 and pouring the mixture into the open top of the cavity 24. After the mixture in the chamber 11 is frozen it may be withdrawn as desired by opening the gate 26. It is to be pointed out that the refrigerating apparatus 12 and the motor 13 for agitating the mixture may be automatically controlled, and will, therefore, not operate continuously. However, the dasher must operate in order for the mixture to flow so that it can be withdrawn. As the gate is opened the spring 33 will cause the plunger 31 to move up and move the valve 44 so that liquid in the container 40 flows into the chamber within the valve. When the required amount of frozen custard has been withdrawn, the gate 29 will be closed by the operator pulling the plunger 31 down and allowing the valve 44 to drop down. This allows the mixture to empty from the valve and flow into the cavity 24 and through opening 25 into the chamber 11. It is to be pointed out that the mixture is admitted to the chamber 11 after the gate 26 is closed and while the dasher is rotating. The dasher will cause the liquid to move toward the back of the chamber 11 wherein it will be immediately frozen. This sequence of operation prevents liquid which has just been admitted into the freezing chamber from running out through the open gate, which might occur if the gate was open at the time when the mixture is introduced into the chamber.

Figure 5:
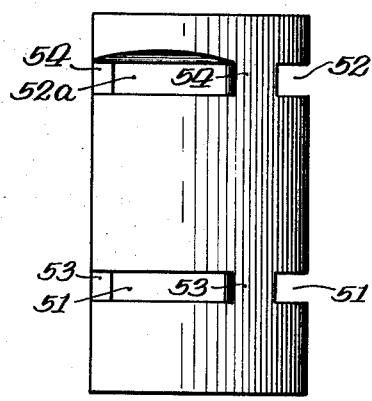
Fig. 5 is a detailed view of the metering valve cylinder.
Figure 6:
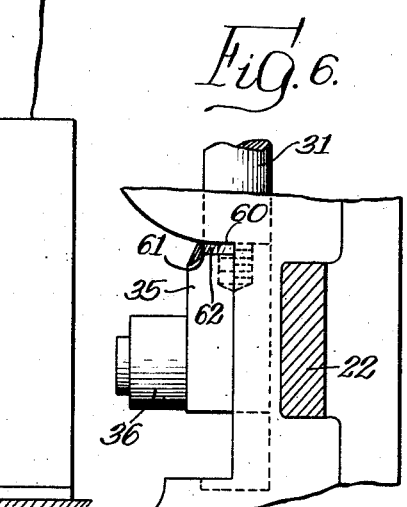
Fig. 6 is a detailed view of the plunger mechanism.

When the valve 44 is opened the lower ports 51 are tightly closed as indicated in Fig. 3 and the upper ports 52 will be immersed in the liquid mixture in the container 42. Air will, of course, be present in the chamber within the valve and this air must escape before the liquid can enter the valve. The air within the valve will be forced out if the ports 52 in the valve are unsymmetrical so that the pressure exerted by the liquid in the container is not uniform. This may be accomplished, for example, by making the port 52a larger than the other ports 52 as indicated in Fig. 5. Another difficulty encountered in the operation of the machine is that frost accumulates on the top surface 60 of the block 35 (Figs. 4 and 6). This prevents the top surface 60 from coming into engagement with the surface 61 of the closure member casting, and, therefore, limits the upward movement of the plunger 31. This difficulty is overcome by tapering the edges of the block 35 as shown at 62. The force of the block 35 against the surface 61 caused by the spring 33 is then sufficient to crack off the ice formed on the tapered surface and, therefore, ice cannot accumulate on the top of surface 60 to prevent the full upward movement of the plunger 31.

The frozen custard machines in accordance with the invention have been found to provide very satisfactory operation. Continuous operation at various freezing rates is provided in a small machine having a very simple structure. Machines as shown in Fig. 1 may be of such size to set on a table for use in a small store or stand. A plurality of different machines can be provided for making custard of different flavors. The structure is easily disassembled for cleaning and is arranged so that accidental flooding of the liquid mixture is not possible.

While certain preferred embodiments of the invention have been described, it is apparent that various changes and modifications can be made therein without departing from the intended scope of the invention as defined in the appended claims.

I claim:

1. In a machine for making frozen custard, ice cream or other frozen products and including a chamber for freezing a prepared mixture, means for adding mixture to said chamber as the frozen product is removed therefrom comprising, a closure for said chamber, said closure having a first opening through which said frozen product is withdrawn and a second opening through which said mixture is admitted, a gate for closing said first opening, a container for said prepared mixture, duct means forming a passage between said container and said second opening, metering means in said passage for controlling the flow of said mixture from said container to said second opening, and a mechanical linkage interconnecting said gate and said metering means for controlling the entry of said mixture in accordance with the removal of said frozen product.

2. In a frozen custard machine including a chamber for freezing a prepared mixture, means for automatically adding mixture to said chamber as the frozen mixture is removed comprising, a closure for said chamber, said closure having an opening through which the frozen custard is withdrawn and a cavity for receiving said prepared mixture for admission into said chamber, a gate for closing said opening, a container for said prepared mixture, and metering means associated with said container and operated by said gate for controlling the entry of said mixture from said container into said cavity, said metering means measuring a fixed quantity of said mixture when said gate is opened and emptying said quantity into said cavity when said gate is closed.

3. In a machine including a chamber for freezing a prepared liquid mixture, means for adding liquid mixture to said chamber as the frozen mixture is removed therefrom comprising, a closure for said chamber, said closure having a first opening through which said frozen mixture is withdrawn and a second opening through which said liquid mixture is admitted, gate means for closing said first opening, a container for said prepared mixture, valve means associated with said container and said closure for supplying a predetermined amount of said mixture to said second opening at each operation thereof, and means interconnecting said valve means and said gate means for causing operation of said valve means each time said gate means is opened and closed.

4. A machine for freezing a prepared liquid mixture comprising, a chamber having a first opening therein through which the frozen mixture is withdrawn and a second opening therein for receiving said prepared liquid mixture, a gate for closing said first opening, a container for said prepared mixture, duct means forming a passage extending between said container and said second opening, and metering means in said passage operated by said gate for controlling the entry of said mixture from said container into said chamber, said metering means automatically supplying a fixed quantity of said liquid mixture to said chamber when said gate is opened and closed.

5. Apparatus for freezing a liquid mixture comprising, a refrigerated chamber, gate means associated with said chamber for withdrawing the frozen mixture therefrom, a container for said liquid mixture, duct means interconnecting said container and said chamber, and metering means associated with said duct means and controlled by said gate means for controlling the flow of said liquid mixture to said chamber.

6. In apparatus including a refrigerated chamber for freezing a liquid mixture, means for controlling the admission of said mixture into said chamber comprising, a closure member for said chamber, gate means on said closure member for withdrawing the frozen mixture from said chamber, a container for said liquid mixture, a cavity in said closure member for receiving said liquid mixture for admission into said chamber, and metering means associated with said container and said closure member and operatively connected to said gate means for controlling the flow of said liquid mixture into said cavity in accordance with operation of said gate means.

7. In a machine for freezing custard, ice cream or other mixture and including a chamber for freezing the liquid mixture, means for automatically adding mixture to said chamber as the frozen mixture is removed comprising, a closure for said chamber, said closure having an opening through which the frozen mixture is withdrawn and a cavity for receiving said liquid mixture for admission into said chamber, a gate for closing said first opening having a projection thereon, a container for said liquid mixture positioned above said cavity and having an opening therein, a sliding valve in said opening in said container including a cylinder having ports therein arranged so that when said valve is in an upper position said liquid mixture flows into said cylinder and when said valve is in the lower position the liquid within said cylinder flows into said cavity, and a vertical plunger bearing against said valve and biased to an upper position, said plunger including a roller adapted to be engaged by said projection on said gate for holding said plunger down when said gate is closed.

8. In a machine for freezing custard, ice cream or other mixtures, means for automatically adding liquid mixture to said machine as the frozen mixture is removed comprising, a closure member for said machine having an opening through which said frozen mixture is withdrawn and a cavity for receiving said liquid mixture, a gate for closing said first opening having a projection thereon, a container for said liquid mixture positioned above said cavity and having an opening therein, a vertically sliding valve in said opening in said container including a cylinder having upper ports therein arranged so that when said valve is in an upper position said liquid mixture flows into said cylinder and lower ports arranged so that when said valve is in the lower position the liquid within said cylinder flows into said cavity, and a vertical slidable plunger bearing against said valve and including a roller positioned to be engaged by said projection and a biasing spring for holding said plunger in an upper position, said plunger being effective to hold said valve in said upper position when said gate is open and allowing said valve to drop to said lower position when said gate is closed.

9. In a machine including a chamber for freezing a liquid mixture, means for automatically supplying mixture to said chamber as the frozen mixture is withdrawn comprising, a gate operable for withdrawing said frozen mixture from said chamber and including a projection thereon, means forming a cavity for receiving said liquid mixture for admission into said chamber, a container for said liquid mixture positioned above said cavity and having an opening with a tubular projection extending therefrom, a valve including a cylinder having a sliding fit in said tubular projection, said cylinder having upper ports therein arranged so that when said valve is in an upper position said ports extend into said container and the liquid mixture flows therethrough into said cylinder, said cylinder having lower ports arranged so that when said valve is in the lower position said lower ports are positioned below said projection and the liquid within said cylinder flows therethrough into said cavity, and a vertical plunger having a top surface bearing against said valve and a roller engaging said projection on said gate so that said cylinder is held in said upper position when said gate is open and is allowed to drop to said lower position when said gate is closed.

10. In a machine including a chamber for freezing a liquid mixture, means for automatically adding mixture to said chamber as the frozen mixture is withdrawn comprising, a gate operable for withdrawing said frozen mixture from said chamber, means forming a cavity for receiving said liquid mixture for admission into said chamber, a container for said liquid mixture positioned above said cavity and having an opening with a tubular projection extending therefrom, including a cylinder having a sliding fit in said tubular projection, said cylinder having upper ports therein arranged so that when said valve is in an upper position said ports extend into said container and the liquid mixture flows into said cylinder, said cylinder having lower ports arranged so that when said valve is in the lower position said lower ports are positioned below said projection and the liquid within said cylinder flows into said cavity, the length of said tubular extension being greater than the sum of the widths of said upper and lower ports and the distance therebetween so that the upper and lower ports cannot be open at the same time, and means interconnecting said valve and said gate so that said cylinder is held in said upper position when said gate is open and is allowed to drop to said lower position when said gate is closed.

11. In a machine including a chamber for freezing a liquid mixture, means for automatically supplying mixture to said chamber as the frozen mixture is withdrawn comprising, a gate operable for withdrawing said frozen mixture from said chamber, means forming a cavity for receiving said liquid mixture and for supplying the same to said chamber, a container for said liquid mixture positioned above said cavity and having an opening with a tubular projection extending therefrom, a valve having a sliding fit in said tubular projection including a cylinder and top and bottom closure members therefor, said cylinder having upper ports therein arranged so that when said valve is in an upper position said ports extend into said container and the liquid mixture fills said cylinder, said cylinder having lower ports arranged so that when said valve is in the lower position said lower ports are positioned below said projection and the liquid within said cylinder flows into said cavity, said top closure member being of larger diameter than said opening and serving to close said opening when said valve is in said lower position, and means interconnecting said valve and said gate so that said cylinder is held in said upper position when said gate is open and is allowed to drop to said lower position when said gate is closed.

12. In a machine including a chamber for freezing a liquid mixture, means for automatically supplying mixture to said chamber as the frozen mixture is withdrawn comprising, a gate operable for withdrawing said frozen mixture from said chamber, means forming a cavity for receiving said liquid mixture for supplying the same to said chamber, a container for said liquid mixture positioned above said cavity and having an opening with a tubular projection extending therefrom, a valve having a sliding fit in said tubular projection including a cylinder and top and bottom closure members therefor, an insert in said cylinder for decreasing the volume of said valve, said cylinder having upper ports therein arranged so that when said valve is in an upper position said ports extend into said container and the liquid mixture fills said cylinder, said cylinder having lower ports arranged so that when said valve is in the lower position said lower ports are positioned below said projection and the liquid within said cylinder flows into said cavity, and means interconnecting said valve and said gate so that said cylinder is held in said upper position when said gate is open and is allowed to drop to said lower position when said gate is closed.

13. In a machine including a chamber for freezing a liquid mixture, means for automatically supplying mixture to said chamber as the frozen mixture is withdrawn comprising, a gate operable for withdrawing said frozen mixture from said chamber, means forming a cavity for receiving said liquid mixture for supplying the same to said chamber, a container for said liquid mixture positioned above said cavity and having an opening with a tubular projection extending therefrom, a valve having a sliding fit in said tubular projection including a cylinder and top and bottom closure members, said cylinder having upper ports therein aranged so that when said valve is in an upper position said ports extend into said container and the liquid mixture flows into said cylinder, said upper ports being of different configurations, said cylinder having lower ports arranged so that when said valve is in the lower position said lower ports are positioned below said projection and the liquid within said cylinder flows into said cavity, and means interconnecting said valve and said gate so that said cylinder is held in said upper position when said gate is open and is allowed to drop to said lower position when said gate is closed.

14. The method of freezing a liquid mixture, comprising the steps of, introducing a quantity of the liquid mixture into a freezing chamber, freezing the liquid mixture in the freezing chamber, opening said freezing chamber to withdraw a portion of said frozen mixture, therefrom, automatically measuring a predetermined amount of liquid mixture as said frozen mixture is withdrawn, closing said freezing chamber, and automatically introducing said measured amount of liquid mixture into said freezing chamber when said chamber is closed.

15. The method of operating freezing apparatus including a freezing chamber, a container with liquid mixture to be frozen, and a gate for withdrawing frozen mixture from the freezing chamber, comprising the steps of, opening said gate to withdraw frozen mixture from said chamber, automatically measuring a predetermined amount of liquid mixture in response to opening of said gate, closing said gate, and automatically introducing said measured amount of liquid mixture into said freezing chamber in response to closing of said gate.

16. The method of freezing a liquid mixture, comprising the steps of introducing a quantity of the liquid mixture into a freezing chamber, freezing the liquid mixture in said freezing chamber, withdrawing a portion of said frozen mixture from said chamber, and automatically introducing a predetermined amount of liquid mixture into said freezing chamber after said portion has been withdrawn.

BEN H. WOODRUFF.

REFERENCES CITED

The following references are of record in the file of this patent:

UNITED STATES PATENTS

| Number | Name | Date |
| --- | --- | --- |
| 1,951,365 | Morrow | Mar. 20, 1934 |
| 1,993,130 | Ballew | Mar. 5, 1935 |